United States Patent [19]

Ballard et al.

[11] 4,214,513
[45] Jul. 29, 1980

[54] ONE-PIECE ROOF VENT DEVICE AND METHODS OF CONSTRUCTING AND UTILIZING SAME

[76] Inventors: James W. Ballard, 34934 Elmira, Livonia, Mich. 48150; Larry R. Ballard, 18633 Negaunee, Redford Township, Marquette County, Mich. 48240

[21] Appl. No.: 968,192

[22] Filed: Dec. 11, 1978

[51] Int. Cl.² .............................................. F24F 13/08
[52] U.S. Cl. ..................................... 98/42 R; 98/66 R
[58] Field of Search ................. 98/66 R, 66 A, 42 R, 98/122, 42 A, 71, 82-84; 52/198, 199

[56] References Cited
U.S. PATENT DOCUMENTS

| | | | |
|---|---|---|---|
| 3,079,853 | 3/1963 | Smith | 98/121 R |
| 3,311,047 | 3/1967 | Smith | 98/37 |
| 3,593,478 | 7/1971 | Mason | 52/302 |
| 4,000,688 | 1/1977 | Malott | 98/42 A |
| 4,080,083 | 3/1978 | Malott | 98/42 A |

Primary Examiner—Henry C. Yuen
Attorney, Agent, or Firm—Irving M. Weiner; Pamela S. Burt; Melvin Yedlin

[57] ABSTRACT

A unitary metal vent apparatus for securement to the roof of a building is formed from a single aluminum disk, into the form of a first flange portion, a tubular second portion, a cap-shaped third portion, and a vent hole portion disposed between the tubular portion and the cap portion. Preferably, the apparatus is produced by spinning a tubular protrusion in an aluminum disk, drilling vent holes, and collapsing the end of the tubular protrusion to form a cap-shaped portion.

8 Claims, 2 Drawing Figures

ONE-PIECE ROOF VENT DEVICE AND METHODS OF CONSTRUCTING AND UTILIZING SAME

This application relates to an improvement over the two-piece roof vent device which is the subject of co-pending application Ser. No. 638,030 filed Dec. 5, 1975, by James R. Petersen and assigned to James W. Ballard.

The present invention relates generally to a novel ventilation apparatus and methods of fabricating and utilizing same. In particular the present invention relates to a one-piece metal ventilation apparatus which is especially suitable for use in conjunction with the roofs of various buildings.

BACKGROUND OF THE INVENTION

Heretofore, there has been in use metal ventilation apparatus which may be secured to roofs for various ventilation purposes. It is well known that if a building is warm inside and cold outside, and there is sufficient humidity within the building, this humidity will condense on contact with the cold surface of the building. This is usually most noticable at the roof. Such condensed humidity or moisture will eventually cause the wood and other roof material to rot, thus necessitating steps to be taken to prevent such condensation from occurring. This is achieved by ventilating adequately all parts of the building where condensation is likely to occur.

In the roof, even when a vapor barrier has been used, condensation may still occur, so that all parts of the roof behind the insulation should be thoroughly ventilated. This can be achieved in part by providing for an air flow between the rafters, and under the sheathing and behind the insulation.

One of the more important needs for ventilation of a roof, to prevent condensation buildup in the space between the inside of a roof and the top of a layer of insulation, is based on the need to conserve energy used for heating and cooling of enclosed spaces. Water from condensation may cause certain types of insulation to decompose and lose efficiency, or, when the insulation is inert to water, water impregnation will cause insulation to conduct heat energy easily.

Apart from the condensation problem mentioned hereinabove, there exists of course the basic ventilation problem of supplying fresh air to indoor places and at the same time removing stale air from these places. For people to feel comfortable, they need fresh air which is free from dust, soot and odors. In addition, the air must not be too warm or too cool, and it must have the right amount of moisture.

The more people there are in a room, or the harder they work, the faster the air becomes stale. Stale air must be removed and replaced with fresh air. If the air outside is fresh, simply opening a window and perhaps turning on a fan will ventilate the room. This of course is not possible if the room is on the inside of a building, or if the space or room to be ventilated is an attic or a crawl space.

The amount of air required for proper ventilation varies, depending on the room and the number of people in it. Under ordinary conditions, from 10 to 30 cubic feet (0.3 to 0.8 cubic meters) of fresh air must be supplied each minute for each person in the room.

The ventilation apparatus of the known type mentioned hereinabove is also helpful in removing harmful materials from the air. In addition, to its use in connection with commercial buildings, it may also find use in mines or tunnels, and factories. In places such as mines or tunnels, poisonous gases may be present which must be removed before men can safely work there. In addition, factories may use such ventilation apparatuses to remove harmful fumes resulting from industrial processes.

One of the disadvantages of the prior art vent apparatus, is that it requires a minimum of two to four separate and distinct members or pieces which are relatively expensive to manufacture and which necessitate a relatively complicated process to construct together to form the desired vent apparatus. Moreover, such conventional vent apparatus is not sturdy, has limited duration of use, is susceptible of deterioration when exposed to the elements, and requires somewhat complicated interconnection procedures.

One prior art device known to applicants is disclosed in U.S. Pat. No. 3,593,478, issued in 1971 to Mason, for a three piece roof ventilator. Other prior art devices known to applicant are shown in U.S. Pat. Nos. 3,079,853, 3,311,047, and 4,000,688, which relate to ventilators adapted to extend along the ridge of a peaked roof constructed in an unconventional manner with a gap between roof boards at the peak of the roof, and U.S. Pat. No. 3,238,862 which discloses a six piece roof ventilator, having a molded plastic rectangular base sheet with a central flange, a molded plastic cover, a louvered metal sheet, and three rivets to hold the cover to the base sheet and entrap the metal sheet.

The problems, disadvantages and complexity alluded to hereinabove are either eliminated or greatly alleviated by the present invention.

BRIEF SUMMARY OF THE INVENTION

The present invention provides a ventilation apparatus in the form of a first substantially horizontal, substantially flat annular portion, a substantially vertical hollow portion concentric with the annular portion, a cap portion co-axial with the vertical portion and a portion containing vent holes sloping downwardly and outwardly from the hollow tubular portion to the cap portion, wherein all four identified portions are formed from a single, continuous, plastically-deformed sheet of material.

It is a primary object of the invention to provide an integral metal air vent apparatus which is fabricated from no more than one piece of metal.

It is a further object of the invention to provide a vent apparatus which is more sturdy than the prior art devices, and which is easier and less costly to manufacture.

It is a further object of the invention to provide a novel method of fabricating an integral air vent device wherein the cap portion is formed from the tubular portion by pressing.

DETAILED DESCRIPTION OF THE INVENTION

Before explaining the invention in detail, it is to be understood that the present invention is not limited in its application to the details of construction and shape of the embodiment illustrated in the accompanying drawings because the invention is capable of other embodiments and of being practiced or carried out in various ways, and with various materials. Furthermore, it is to be understood that the phraseology and terminology employed herein is for the purpose of description and illustration only, and not for the purpose of limitation.

Figure 1:
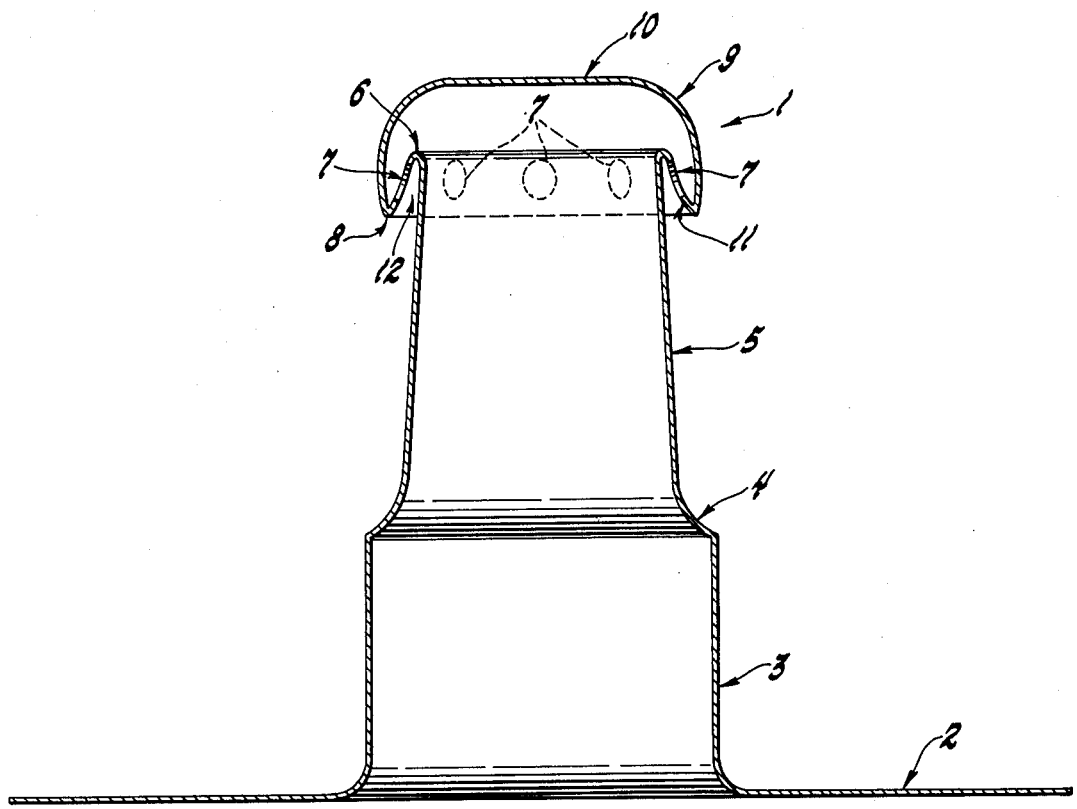
FIG. 1 is a side elevational view, in section taken along a diameter of the illustrated embodiment of the present invention.

Referring to the drawings, and in particular to FIG. 1, there is shown a ventilation apparatus 1 in accordance with the present invention. In FIG. 1, the substantially flat, annular base portion 2 of the ventilation apparatus would be disposed adjacent a flat portion of a roof, and would be covered with a fibergel membrane and asphalt, and possibly other roofing materials and flashing materials. In FIG. 1, substantially cylindrical portion 3 is integral with base portion 2, and extends to approximately one third of the overall height of the illustrated embodiment, and is integrally connected to truncated conical portion 5 by arcuate transition section 4. Note that it is desirable, although not necessary to practice the invention, that the lower tubular portion be cylindrical, as shown, rather than a tapered continuation of a surface similar to that of the illustrated portion 5.

Figure 2:
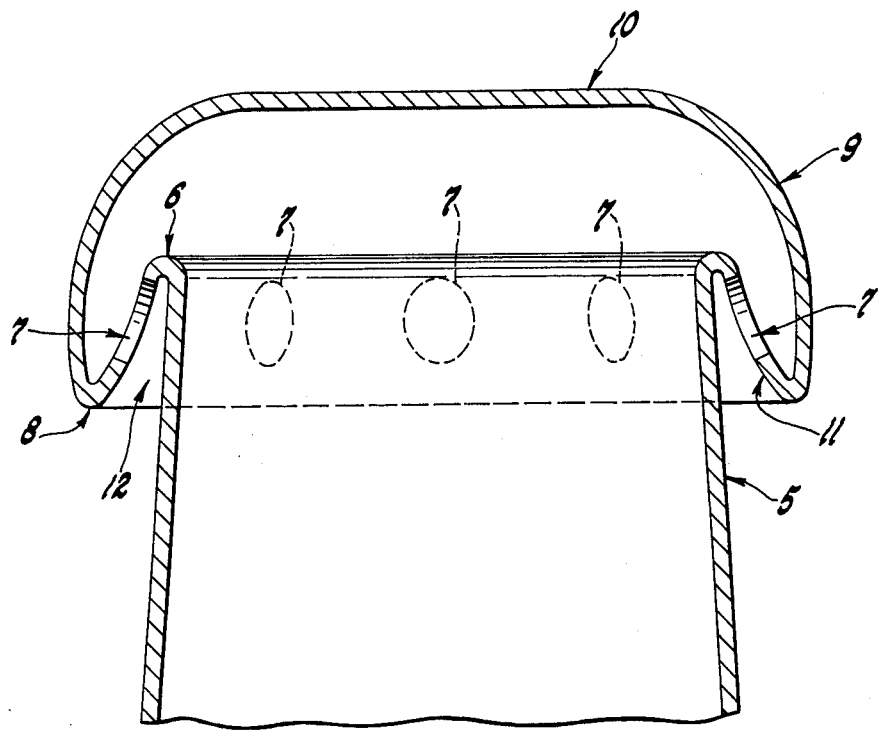
FIG. 2 is an enlarged view showing the cap portion of the embodiment of the invention shown in FIG. 1.

Referring to FIG. 2, first bend portion 6 is interposed between portion 11 and truncated conical portion 5. Portion 11 is provided with a plurality of vent holes 7, and is disposed outwardly and downwardly from bend portion 6, forming annular space 12 between portion 11 and at least a portion of the exterior surface of portion 5, which annular space is disposed substantially concentric with portion 5. Note that holes 7 are preferably, although not necessarily, located in close proximity to a second bend portion 8, to minimize the amount of condensate which may collect in the concave inner curvature of bend portion 8. Also note that holes 7 can be placed in portion 5, rather than portion 11, although the result would be condensate dripping into the ventilated space.

It is of course possible to drill drain holes in bend portion 8, although this would reduce the manufacturing advantages of the illustrated embodiment, without yielding a significant practical advantage, since the minor amount of condensate which could collect would evaporate rapidly.

The horizontal substantially flat top portion 10 and generally arcuate side portion 9 form a cap-like structure over the top of vertical truncated conical portion 5.

In accordance with a preferred and working embodiment, the ventilation apparatus 1 was fabricated from an alluminum alloy known as 3003, which contains 1.2% Mn. This aluminum alloy was also dipped in caustic acid.

A significant feature of the present invention resides in the fact that the entire ventilation apparatus is produced from a single circular piece of metal, providing a strong structure, and eliminating the need for any fastening means which may corrode or become loose with the passage of time, as well as eliminating joints between dissimilar metals where galvanic corrosion can occur.

Although any number of holes 7 may be provided in portion 11, eight such apertures have been found convenient in some preferred embodiments of the present invention.

One working and operable embodiment of the present invention is formed by placing a circular aluminum metal blank in a spinning lathe, and forming a generally cylindrical portion in the center of the blank by use of a first die in the general form of portion 5 of the illustrated embodiment. Using a second die, in the general form of portion 3, 4 or 5 of the illustrated embodiment, areas 3, 4, and 5 are formed, and a groove is formed in bend portion 6. Holes 7 are then drilled adjacent to bend portion 6. The workpiece is then placed in a press, and the cap portion is formed by collapsing the workpiece around bend portion 6, using a die similar in shape to portions 9 and 10 of the illustrated embodiment. Similar structure can also be achieved using deep draw stamping techniques.

It is of course obvious that the invention can be manufactured in numerous ways, on various types of machines, and with numerous different materials, as would be apparent to those skilled in the art, without departing from the scope and spirit of the invention, as set forth in the appended claims.

We claim:

1. A one-piece ventilation apparatus comprising:
   a substantially horizontal flat annular base portion;
   a generally tubular portion extending integrally upwardly from said base portion;
   a first bend portion extending integrally outwardly and downwardly from the upper end of said tubular portion;
   a vent-hole portion extending integrally downwardly from said first bend portion;
   a second bend portion extending integrally upwardly from said vent-hole portion;
   an arcuate cap side portion extending integrally upwardly from said second bend portion;
   a substantially horizontal cap top portion extending integrally above said arcuate cap side portion;
   said vent-hole portion having a plurality of vent holes provided therein;
   said apparatus being entirely integrally and unitarily formed from a single piece of deformable material; and said generally tubular portion comprises:
   a lower substantially cylindrical portion extending integrally upwardly from said base portion;
   an intermediate arcuate transition portion; and
   an upper substantially truncated conical portion.

2. A one-piece ventilation apparatus according to claim 1, wherein:
   said substantially cylindrical portion defines substantially one-third of the overall height of said apparatus.

3. A one-piece ventilation apparatus according to claim 1, wherein:
   said vent holes are disposed proximal to said second bend portion.

4. A one-piece ventilation apparatus according to claim 1, wherein:
   said deformable material comprises aluminum.

5. A one-piece ventilation apparatus according to claim 1, wherein:
   an annular space is defined between said vent-hole portion and the upper external end surface of said truncated conical portion.

6. A one-piece ventilation apparatus according to claim 1, wherein:

said base portion, cylindrical portion, transition portion, conical portion, cap side portion, and cap top portion are all relatively concentric.

7. A one-piece ventilation apparatus according to claim 1, wherein:

said deformable material is a thermoplastic material.

8. A one-piece ventilation apparatus according to claim 1, wherein:

said deformable material is an aluminum alloy.

* * * * *